United States Patent [19]
Hess

[11] Patent Number: 5,825,094
[45] Date of Patent: Oct. 20, 1998

[54] TURBINE ARRAY

[75] Inventor: Neil E. Hess, York, Pa.

[73] Assignee: Voith Hydro, Inc., York, Pa.

[21] Appl. No.: 748,685

[22] Filed: Nov. 13, 1996

[51] Int. Cl.$^6$ ..................................................... F03B 13/10
[52] U.S. Cl. ................................ 290/54; 290/43; 290/52; 290/53
[58] Field of Search ................................ 290/42, 43, 52, 290/53, 54; 405/78; 60/398

[56] References Cited

U.S. PATENT DOCUMENTS

| | | |
|---|---|---|
| 914,399 | 3/1909 | Francher . |
| 2,360,961 | 10/1944 | Mayo ............................................ 61/28 |
| 3,184,218 | 5/1965 | Hochwalt et al. ......................... 253/31 |
| 4,039,847 | 8/1977 | Diggs ........................................ 290/42 |
| 4,143,990 | 3/1979 | Atencio .................................... 405/78 |
| 4,165,467 | 8/1979 | Atencio .................................... 290/52 |
| 4,207,015 | 6/1980 | Atencio .................................... 405/78 |
| 4,261,171 | 4/1981 | Atencio .................................... 60/398 |
| 4,289,971 | 9/1981 | Ueda ........................................ 290/52 |
| 4,319,142 | 3/1982 | Mayo, Jr. ................................. 290/52 |
| 4,468,153 | 8/1984 | Gutierrez Atencio .................... 405/78 |
| 4,476,396 | 10/1984 | Calvert, Jr. .............................. 290/53 |
| 4,755,690 | 7/1988 | Obermeyer ............................... 290/52 |
| 4,804,855 | 2/1989 | Obermeyer ............................... 290/54 |

FOREIGN PATENT DOCUMENTS 269807  4/1927  United Kingdom .

Primary Examiner—Steven L. Stephan
Assistant Examiner—Nicholas Ponomarenko
Attorney, Agent, or Firm—Foley & Lardner

[57] ABSTRACT

A hydroelectric power generating module comprises an upper housing section and a lower base section connected to the upper housing. The upper housing has a plurality of generators situated therewithin, and the lower base has a plurality of water flow paths extending therethrough. Each water flow path comprises an upstream water inlet, a downstream draft tube, and a distributor disposed intermediate the draft tube and the water inlet. The water inlets are defined by a plurality of horizontal members interconnected with a plurality of vertical members to form an array of water tubes having generally parallel axes. A plurality of turbines is provided wherein each turbine has a runner rotatably mounted within an associated water flow path downstream of an associated distributor. The runners are mechanically coupled to the generators for generating hydroelectric power by rotation of the runners when water travels through the water flow paths. The interconnected members form a sturdy but lightweight reinforcing bulkhead structure upstream of the runners for guiding the water flow to the runners while carrying hydraulic and gravitational loads on the module. Flap gates may be associated with the draft tubes to control water flowing therethrough. The flap gates when in an open position are configured so that all structures associated therewith are located outside the draft tubes. In an array of water tubes having at least two rows and a plurality of columns, the turbines of a common column are mechanically coupled to a single generator by a hypoid gearing arrangement.

40 Claims, 9 Drawing Sheets

TURBINE ARRAY

FIELD OF THE INVENTION

The present invention relates generally to hydroelectric turbine installations. More particularly, this invention pertains to movable hydroelectric modules for installation in conventional spillways. Even more particularly, this invention relates to hydroelectric modules comprising an array of water tubes wherein a turbine is disposed within each water tube.

BACKGROUND OF THE INVENTION

Movable hydroelectric modules for installation in conventional spillways are particularly advantageous for existing relatively low-head structures such as dams and dikes utilized to control water flow. These existing structures can be made to produce energy at competitive rates, but a major problem is that the spillways so provided must remain capable of handling flood water conditions.

A number of power generating units have been designed in recent years in which at least the portion of the unit containing the turbines can be lifted clear of the spillway during floods. A common feature of these moveable generating units is the use of a plurality of relatively lightweight, small turbines arranged in an array. For example, U.S. Pat. No. 4,319,142 to Mayo, Jr. discloses a hydraulic turbine unit with multiple turbines arranged in a horizontal row. The Mayo unit includes a fabricated S-shaped steel water passageway and cross beams which serve as lateral support between lifting devices which are operable to lift the entire structure from the spillway to reduce obstruction. A separate generator is positioned along the rear axis of each runner and coupled thereto for generating hydroelectric power.

Other examples of movable turbine units are disclosed in U.S. Pat. Nos. 4,804,855 and 4,755,690 to Obermeyer. The Obermeyer turbine units utilize an array of water tubes connected to each other by leading and trailing tie means located at the leading and trailing edges of the draft tube, respectively, i.e., to create a truss-like bulkhead structure rearwardly of the turbine runners. Each draft tube may include a butterfly type valve situated therewithin operable between a closed position and an open position to control water flow through the tube. A shortcoming of this valve arrangement is that components of the valve (e.g., the butterfly plate centrally located within the draft tube) remain in the water flow through the draft tube even in the fully open position, thus causing efficiency losses. A dedicated generator is positioned along the front axis of each runner and coupled thereto for generating hydroelectric power. A framework of interconnected horizontal, vertical and diagonal rods surrounds the generators in front of the bulkhead.

In addition, providing dedicated generators for the turbines may unecessarily increase the weight of the array and also increase component and maintenance costs. Moreover, and most importantly, known turbine arrays have heretofore not made efficient use of structural members for other purposes in the array such as guiding water.

SUMMARY OF THE INVENTION

The present invention includes a hydroelectric power generating module configured for placement in a spillway through which water flows. The module comprises an upper housing section having a plurality of generators situated therewithin and a lower base section connected to the upper housing. The lower base includes water flow paths extending therethrough from an upstream end to a downstream end. Each water flow path comprises a water inlet proximate the upstream end, a draft tube extending from the downstream end toward the water inlet by a predetermined distance, and a distributor disposed intermediate the draft tube and the water inlet. The water inlets are defined by the interconnection of horizontal and vertical members to form an array of water tubes having generally parallel axes. A plurality of turbines is provided in which each turbine has a runner rotatably mounted within an associated water flow path downstream of an associated distributor. The runners are mechanically coupled to the generators for generating hydroelectric power when water travels through the water flow paths.

According to another aspect of the invention, the interconnected members defining the water inlets form a lightweight reinforcing bulkhead structure upstream of the runners for guiding the water flow to the runners and carrying hydraulic and gravitational loads on the module.

According to a further aspect of the invention, the water flow paths are arranged in a single horizontal row, the flow paths being associated with flap gates to control water flowing therethrough. The flap gates are configured so that when the gate is in an open position, all structures associated therewith are located outside the draft tubes to minimize flow losses.

According to another aspect of the invention, the water flow paths are arranged in an array having at least two rows and a plurality of columns. A like plurality of generators is provided in which the turbines of each column are mechanically coupled to a respective one of the generators by a bevel type gearing arrangement, preferably a hypoid gear.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

Figure 1:
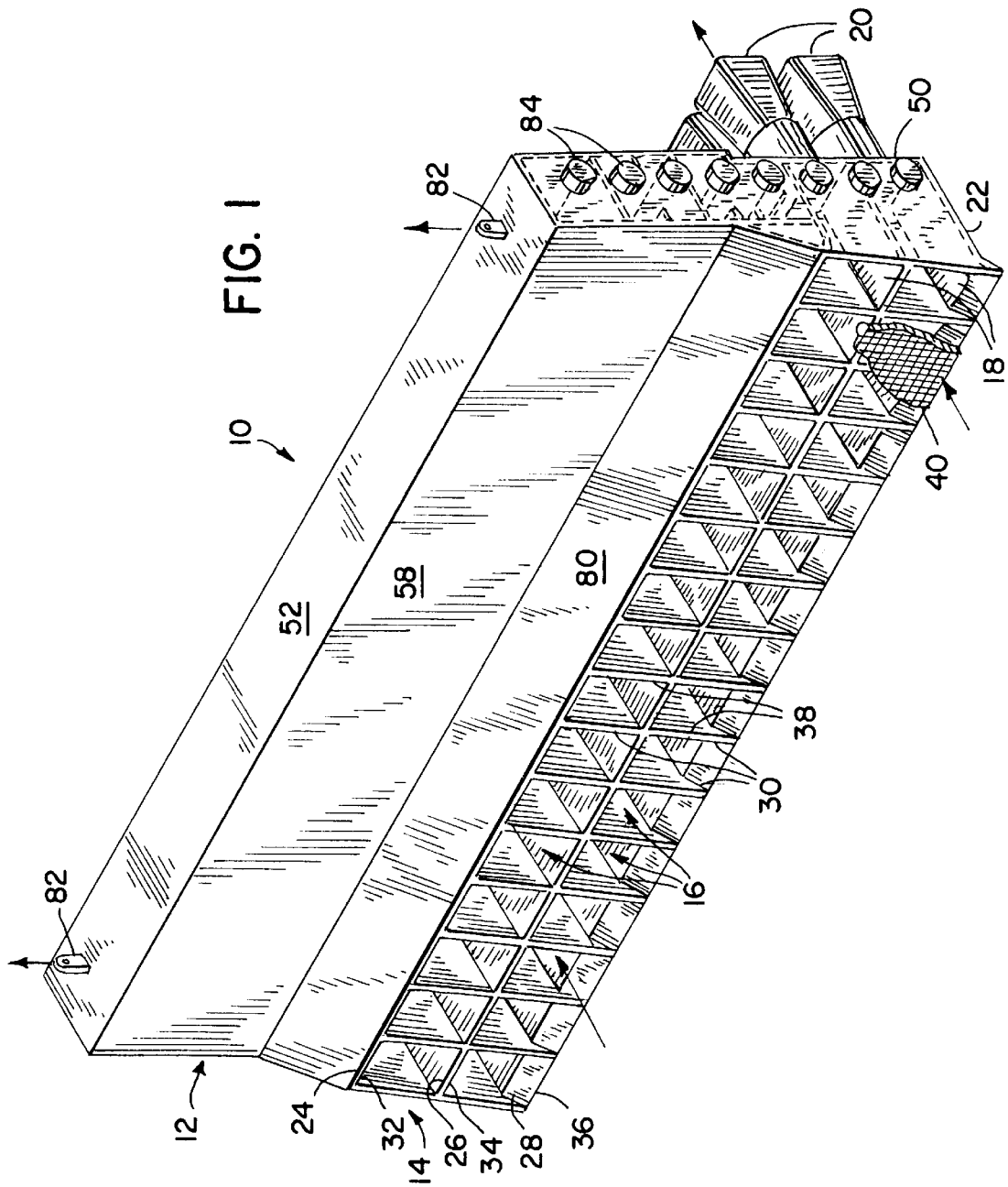
FIG. 1 is a perspective view, with portions broken away, of a movable hydroelectric power generating module including a multi-row array of water tubes.

Referring to FIG. 1, a movable hydroelectric power generating module generally designated as 10 is configured for placement in a spillway (not shown) through which water flows. Generating module 10 comprises an upper housing section 12 and a lower base section 14, which together form a removable dam when placed in the spillway.

Lower base section 14 includes a plurality of water flow paths 16 extending therethrough from an upstream end 18 to a downstream end 20. In the embodiment of FIGS. 1–4, thirty-two water flow paths 16 are arranged in an M×N rectangular array comprising two horizontal rows and sixteen vertical columns. Of course, it will be understood that the number of rows (M) and columns (N) will vary as needed for the particular site. For example, the number of rows may depend on factors such as the typical head available and the desired generating capacity, while the number of columns may depend on factors such as the size of each turbine and the width of the spillway. Moreover, the array could be of shapes other than rectangular (e.g., T-shaped) to match an existing spillway.

Figure 2:
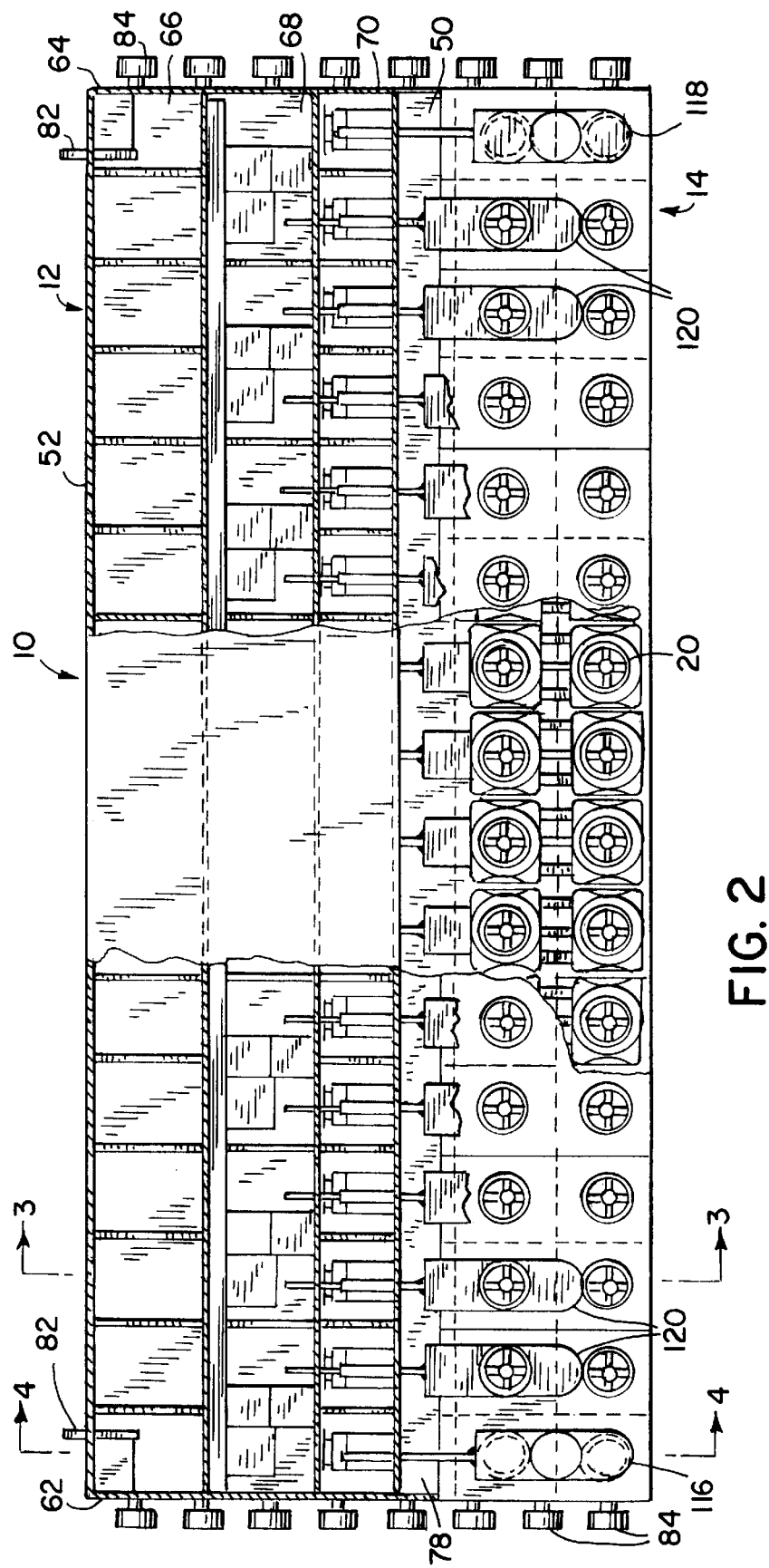
FIG. 2 is a rear elevation view, with portions broken away and portions in transverse-section taken at the location of the draft tube sliding gates, of the generating module of FIG. 1.
Figure 3:
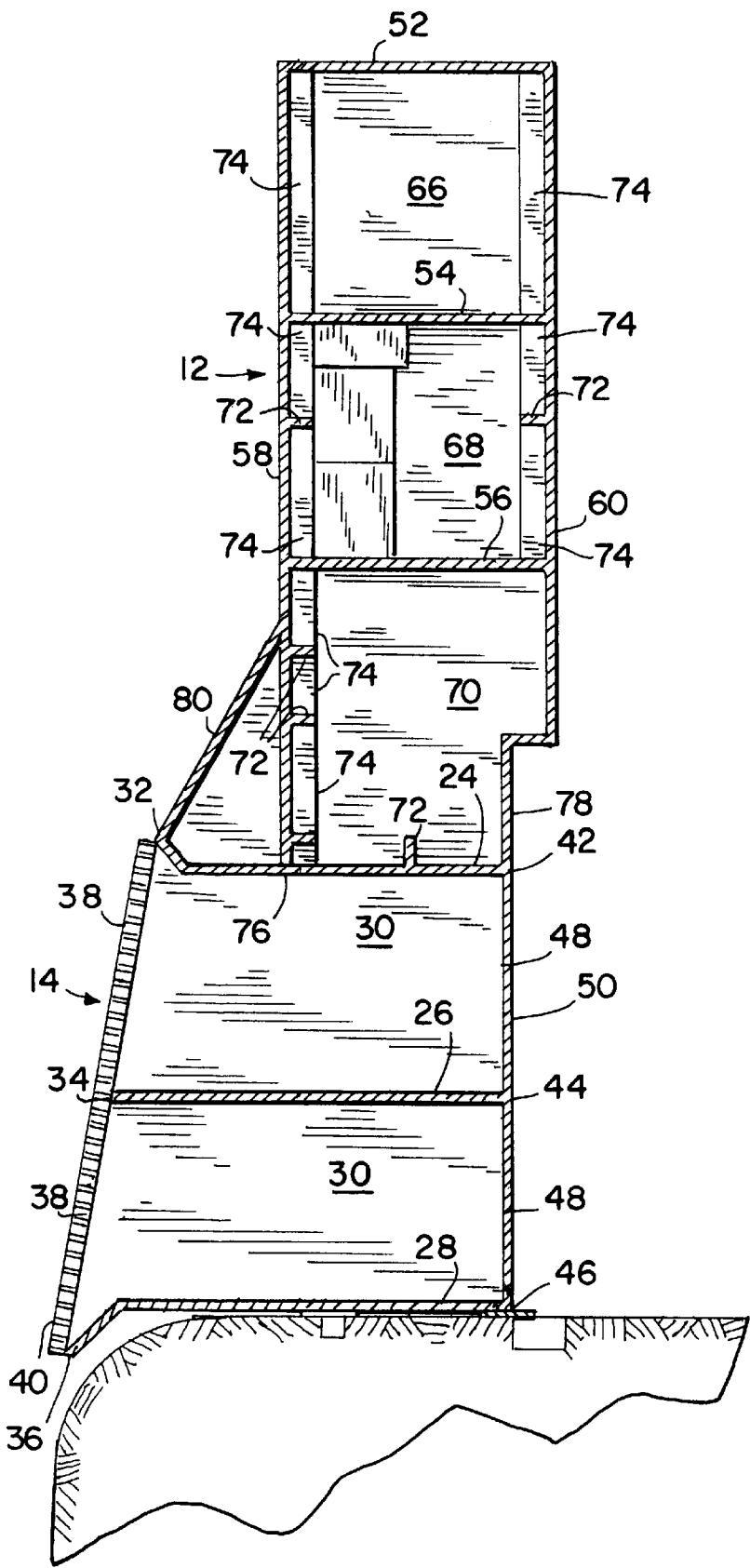
FIG. 3 is a cross-sectional view of the generating module of FIG. 1 taken along line 3—3 in FIG. 2, with the power generating components removed, showing the main structural elements of the module.

Referring now to FIGS. 1–3, lower base section 14 comprises a sturdy but lightweight bulkhead structure 22 formed by the interconnection of three spaced apart, laterally extending horizontal members 24, 26, 28 with a plurality of spaced apart, longitudinally extending vertical members 30. Horizontal members 24, 26, 28 are preferably continuous steel plates which extend the entire width of bulkhead structure 22, that is, the entire width of module 10. Horizontal members 24, 26, 28 thus function as main structural elements of module 10 enabling it to withstand loads in the horizontal direction due to water pressure without the need and expense of providing external reinforcement at the dam site. The interconnected members may be secured together by any well known method suitable for the materials being joined, e.g., by welding for the steel plates. Similarly, any mention of securing or joining below is by well known means (e.g., welding) unless otherwise specified.

As best shown in FIG. 3, horizontal members 24, 26, 28 have upstream edges 32, 34, 36, respectively, and vertical members 30 have upstream edges 38. Upstream edges 32, 34, 36, 38 define a generally planar upstream (or forward) region of bulkhead 22 to which a trash rack 40 may be secured. Upstream edge 32 of uppermost horizontal member 24 is preferably upturned, and upstream edge 36 of lowermost horizontal member 28 is preferably downturned. Edges 32, 36 are respectively upturned and downturned primarily to increase the area of the water inlet opening, which decreases the velocity and increases the pressure of the water entering the water inlet, but the flanges may also contribute to the structural integrity of bulkhead 22.

Horizontal members 24, 26, 28 have downstream edges 42, 44, 46, respectively, and vertical members 30 have downstream edges 48. Downstream edges 42, 44, 46, 48 define a generally planar downstream (or rear) region of bulkhead 22 to which a transversely extending, vertical member 50 is secured. Vertical member 50 is preferably a continuous steel plate which spans the entire width and height of bulkhead structure 22, and preferably spans a lower portion of upper housing section 12 as well. Vertical member 50 thus functions as a main structural element of module 10, enabling it to withstand loads in the vertical direction due to gravity when lifted from the spillway by a suitable lifting device (not shown).

Upper housing section 12 includes three spaced apart, laterally extending horizontal members 52, 54, 56, an upstream (or front) wall 58, a downstream (or rear) wall 60, and a pair of side walls 62, 64 (see FIG. 2). Horizontal members 52, 54, 56 are preferably continuous steel plates which extend the entire width of module 10, thereby dividing upper housing 12 into three air filled equipment compartments 66, 68 and 70. Horizontal members 52, 54, 56 function as structural elements of module 10, enabling it to withstand loads in the horizontal direction caused by water pressure. Upper housing section 12 may be additionally reinforced as needed by laterally extending ribs 72 and vertically extending ribs 74 (see FIG. 3). Lateral ribs 72 preferably extend continuously across the entire width of module 10.

Upper housing 12 is secured to lower base 14 by joining a lower edge 76 of front wall 58 to uppermost horizontal member 24, and by joining an upper portion 78 of transverse member 50 to upper housing 12. For additional reinforcement, and to reduce trash-buildup, an inclined plate 80 is preferably secured between front wall 58 of upper housing 12 and horizontal member 24 of lower base 14. Inclined plate 80 preferably extends continuously across the entire width of module 10.

As best shown in FIGS. 1 and 2, module 10 is configured for lifting by providing a pair of lift eye ribs 82 secured to the top of upper housing 12. In addition, a plurality of guide wheels 84 are preferably secured along the lateral sides of module 10 for engagement with an existing slot (not shown) on the sides of the spillway.

Figure 4:
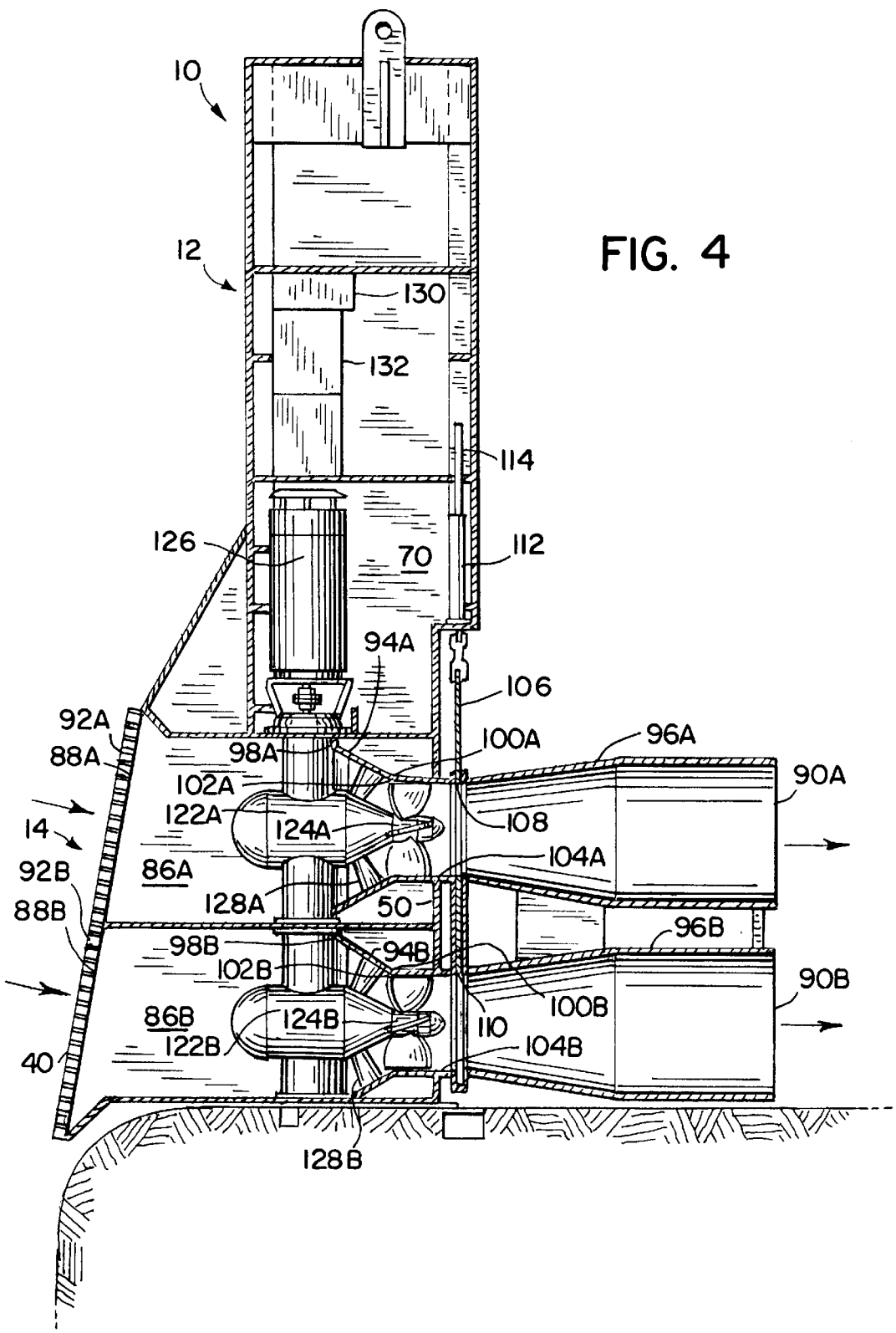
FIG. 4 is a cross-sectional view of the generating module of FIG. 1 taken along line 4—4 in FIG. 2, showing the power generating components common to a vertical column.

Referring now to FIG. 4, one vertical column with its associated generating components will be described, the remaining columns being similar. An upper and a lower water flow path 86A and 86B are provided between an upstream end 88A, 88B and a downstream end 90A, 90B. Water flow path 86A, 86B comprises a water inlet 92A, 92B, a distributor shroud 94A, 94B, and a draft tube 96A, 96B. Water inlet 92A, 92B is proximate upstream end 88A, 88B, draft tube 96A, 96B is proximate downstream end 90A, 90B, and distributor shroud 94A, 94B is positioned intermediate draft tube 96A, 96B and water inlet 92A, 92B. Distributor shroud 94A, 94B is rectangular in cross section at an inlet (or upstream) end 98A, 98B and circular in cross section at a throat (or downstream) end 100A, 100B. Inlet end 98A, 98B is secured to an inner surface of water inlet 92A, 92B, and throat end 100A, 100B is secured to a forward end 102A, 102B of draft tube 96A, 96B. Transversely extending vertical member 50 includes a circular aperture 104A, 104B through which draft tube 96A, 96B extends.

A sliding water control gate 106 associated with the column being described (and shown in FIG. 4) is configured to slide transversely through draft tubes 96A and 96B downstream of respective forward ends 102A and 102B. Control gate 106 has a circular aperture 108 spaced from a distal end 110 of gate 106 such that aperture 108 is in register with throat 100A (and aperture 104A) when gate 106 is in an upper open flow position (as illustrated in FIG. 4), and aperture 108 is intermediate throats 100A and 100B (and intermediate apertures 104A and 104B) in a lower closed flow position. An actuator 112, mounted in equipment compartment 70, has a downwardly extendable arm 114 for moving control gate 106 between the lower closed position and the upper open position. Actuator 112 is controlled by any suitable control means (not shown). Returning briefly to FIG. 2, the two lateral most control gates 116 and 118 are shown in the closed position, and the remaining control gates 120 are shown in the open position. It will thus be appreciated that each of the control gates may be operated independently.

Referring again to FIG. 4, a turbine 122A, 122B is mounted within water flow path 86A, 86B, and turbine 122A, 122B has a rotatably mounted runner 124A, 124B positioned downstream of distributor shroud 94A, 94B. Stay vanes 128A, 128B are provided within water flow path 86A, 86B upstream of runner 124A, 124B to serve as a mounting means therefor and to direct water thereto. As described in more detail below, both runners 124A and 124B of the common vertical column now being described (and illustrated in FIG. 4) are mechanically coupled to a single generator 126 located in lower air filled equipment compartment 70 of upper housing section 12. When air-filled compartment 70 is large enough to allow worker access during operation of module 10, which will normally be the case, this arrangement makes it particularly easy to service the generators and other components or items typically associated therewithin, e.g., a power bus cabinet 130 and a switchgear cabinet 132.

Figure 5:
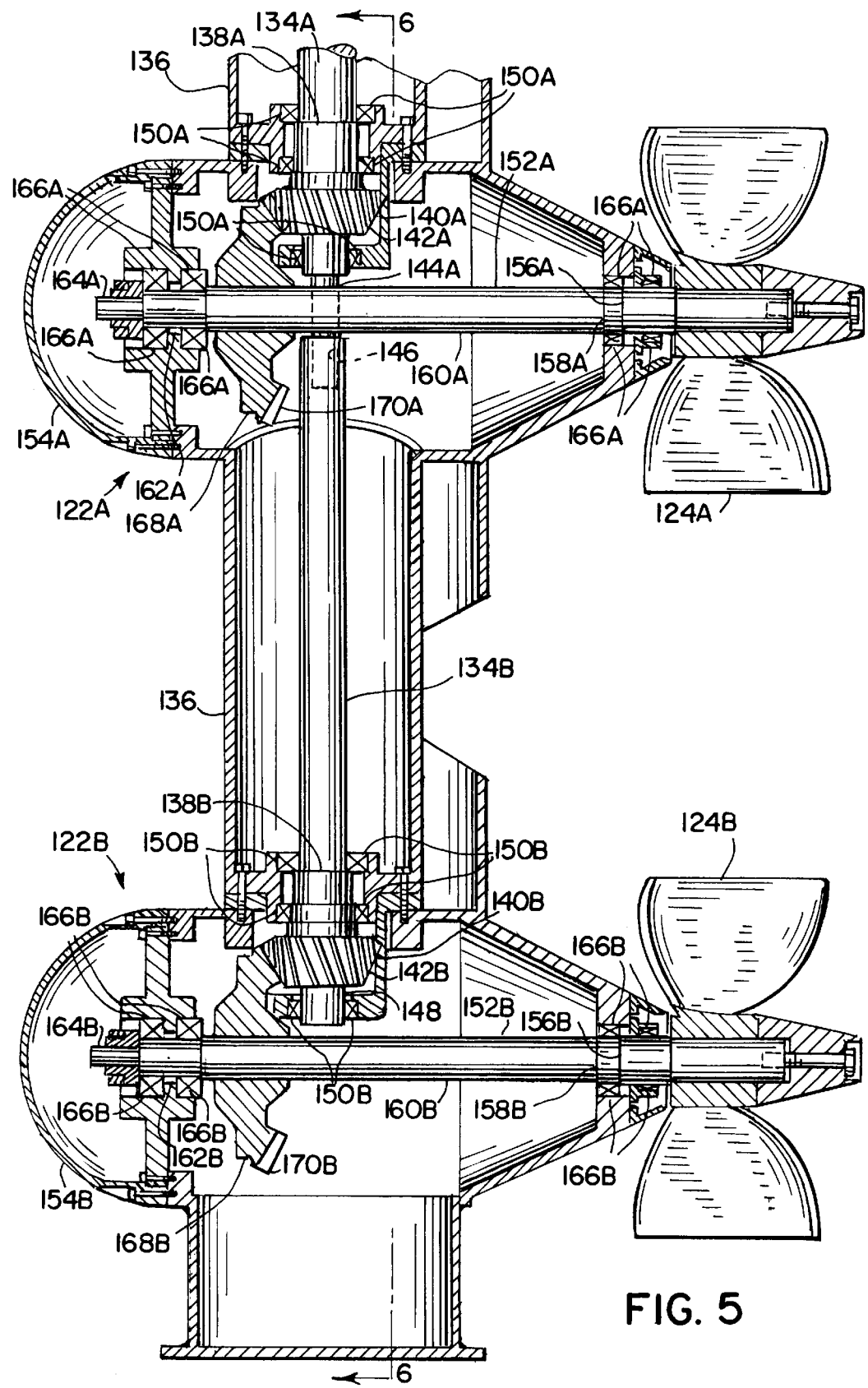
FIG. 5 is a cross-sectional view of two turbines showing a preferred arrangement for coupling the turbines to a common generator shaft, suitable for use in the power generating module of FIG. 1.
Figure 6:
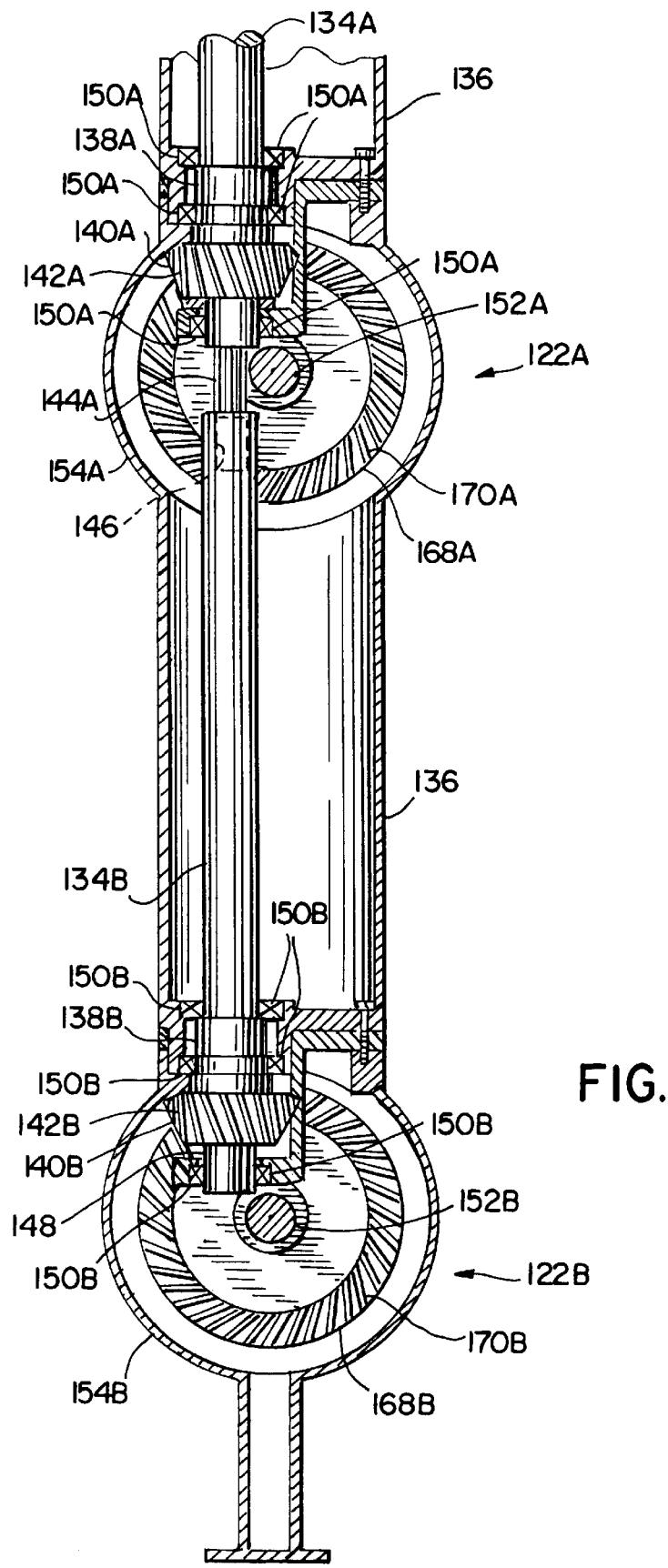
FIG. 6 is a transverse-sectional view of the hypoid gear arrangement of FIG. 5 taken along line 6—6 shown in FIG. 5.

Turning now to FIGS. 5 and 6, the mechanical coupling arrangement of turbines 122A and 122B to generator 126 will be fully described. Generator 126 includes or is coupled to a vertical shaft 134A extending downwardly therefrom within a shaft housing 136. Vertical shaft 134A includes an enlarged diameter collar 138A, a pinion 140A having teeth 142A, and a reduced diameter distal end 144A having a portion thereof secured within an axially aligned recess 146 of a vertical shaft extension 134B. Distal end 144A is preferably provided with vertically extending ridges to strengthen the coupling of vertical shaft 134A with shaft extension 134B and to reduce the likelihood of relative rotation therebetween. Shaft extension 134B includes an enlarged diameter collar 138B, a pinion 140B having teeth 142B, and a distal end portion 148. A plurality of pinion bearings 150A, 150B are provided which engage shaft 134A, 134B and collar 138A, 138B to support shaft 134A, 134B for rotation while under load.

Runner 124A, 124B is coupled to a horizontal shaft 152A, 152B extending forwardly therefrom within a bulb type housing 154A, 154B. Horizontal shaft 152A, 152B includes an enlarged diameter collar 156A, 156B adjacent runner 124A, 124B, a step portion 158A, 158B, a main portion 160A, 160B, a reduced diameter end 162A, 162B, and a central pin 164A, 164B. A plurality of shaft bearings 166A, 166B are provided which engage collar 156A, 156B, step portion 158A, 158B, and reduced diameter end 162A, 162B, to support shaft 152A, 152B for rotation while under load. A large gear 168A, 168B is mounted on horizontal shaft 152A, 152B having teeth 170A, 170B which engage respective pinion teeth 142A, 142B.

As best seen in FIG. 6, the gear coupling arrangements of pinion 140A with gear 168A, and pinion 140B with gear 168B, are preferably hypoid. That is, pinion teeth 142A, 142B are preferably spirally cut teeth, gear teeth 170A, 170B are preferably non-radially cut teeth, and the common axis of vertical shafts 134A and 134B is preferably offset from the axes of horizontal shafts 152A and 152B. Moreover, the diameter of reduced diameter end 144A of vertical shaft 134A is small enough to provide sufficient clearance for horizontal shaft 152A to pass nearby. Thus, the hypoid gear arrangement allows more than one row of turbine units to drive a common generator without accumulating loads from more than one turbine on the meshing teeth of any one gear set. This reduces loads in the gear train, which decreases losses, and thereby improves the operating efficiency of module 10.

Figure 7:
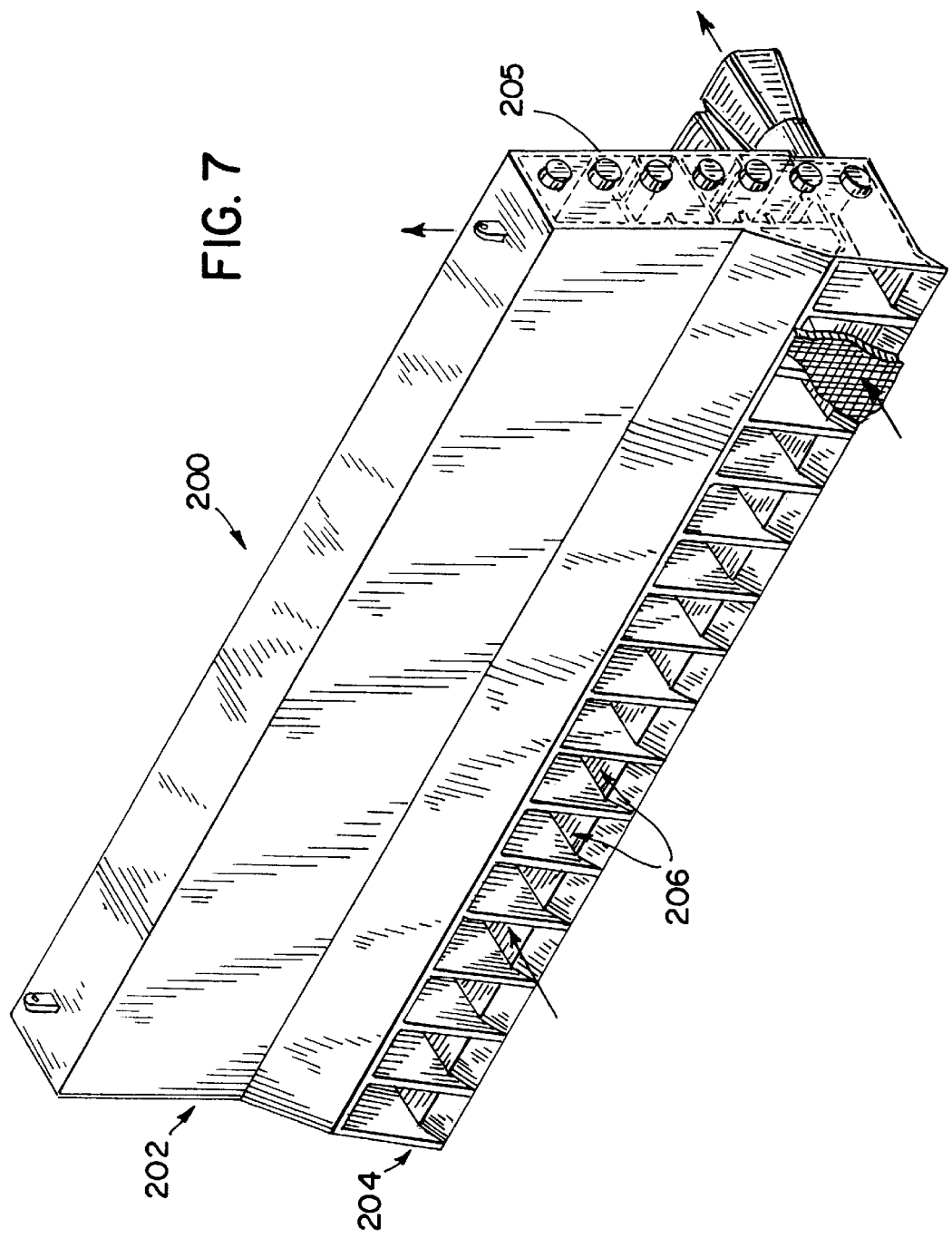
FIG. 7 is a perspective view, with portions broken away, of a movable hydroelectric power generating module including a single horizontal row of water tubes.
Figure 8:
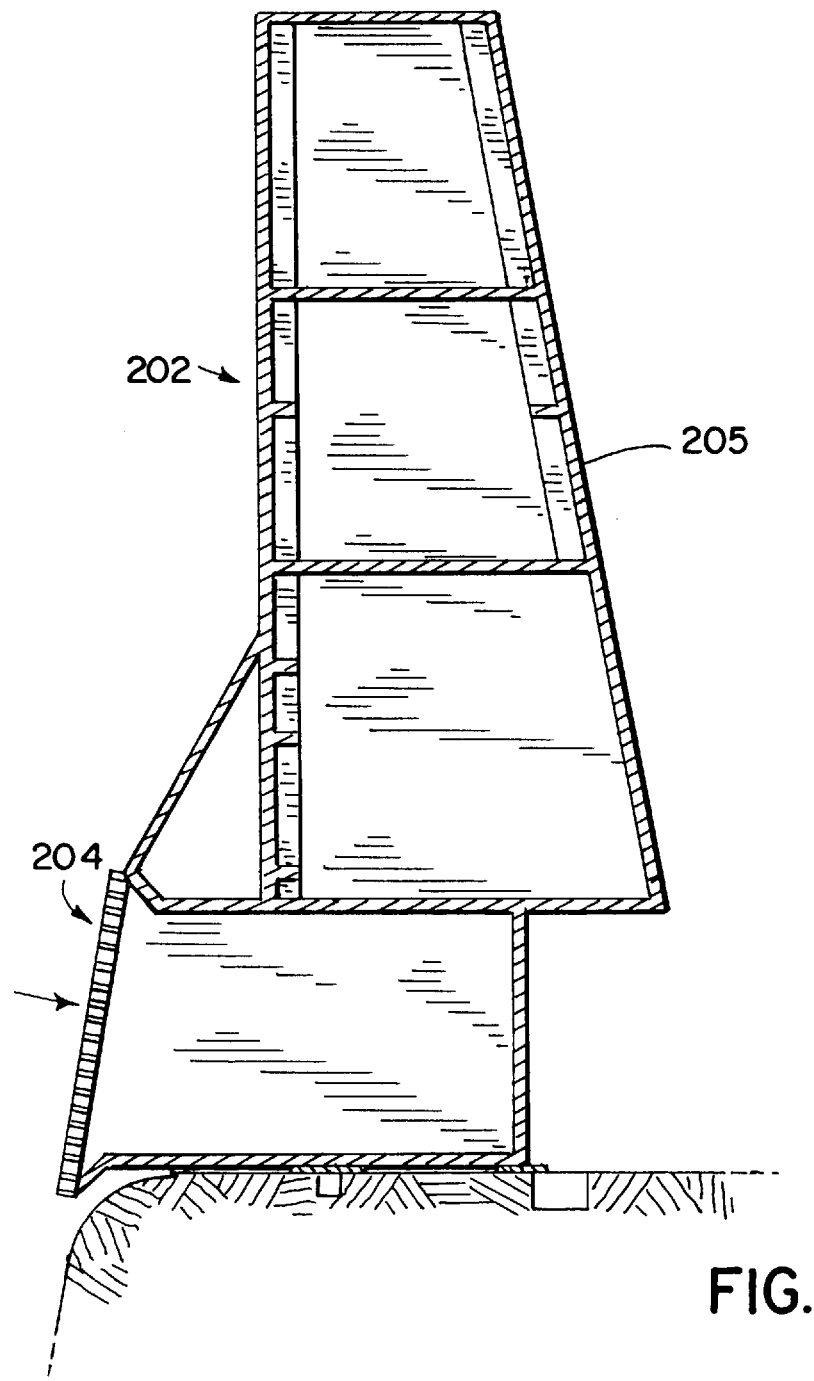
FIG. 8 is a cross-sectional view of the generating module of FIG. 7, with the power generating components removed, showing the main structural elements.

Referring now to FIGS. 7 and 8, another embodiment of a movable hydroelectric power generating module designated generally as 200 will be described. The description of module 200, however, will be generally limited to aspects thereof which differ from module 10 as described above, the remaining aspects otherwise being substantially the same. Module 200 includes an upper housing section 202 and a lower base section 204. Upper housing 202 preferably has an outwardly inclined rear wall 205 (rather than vertical, as best seen in FIG. 8), and lower base 204 has sixteen water flow paths 206 arranged in a single horizontal row (rather than thirty-two water flow paths arranged in two horizontal rows).

Figure 9:
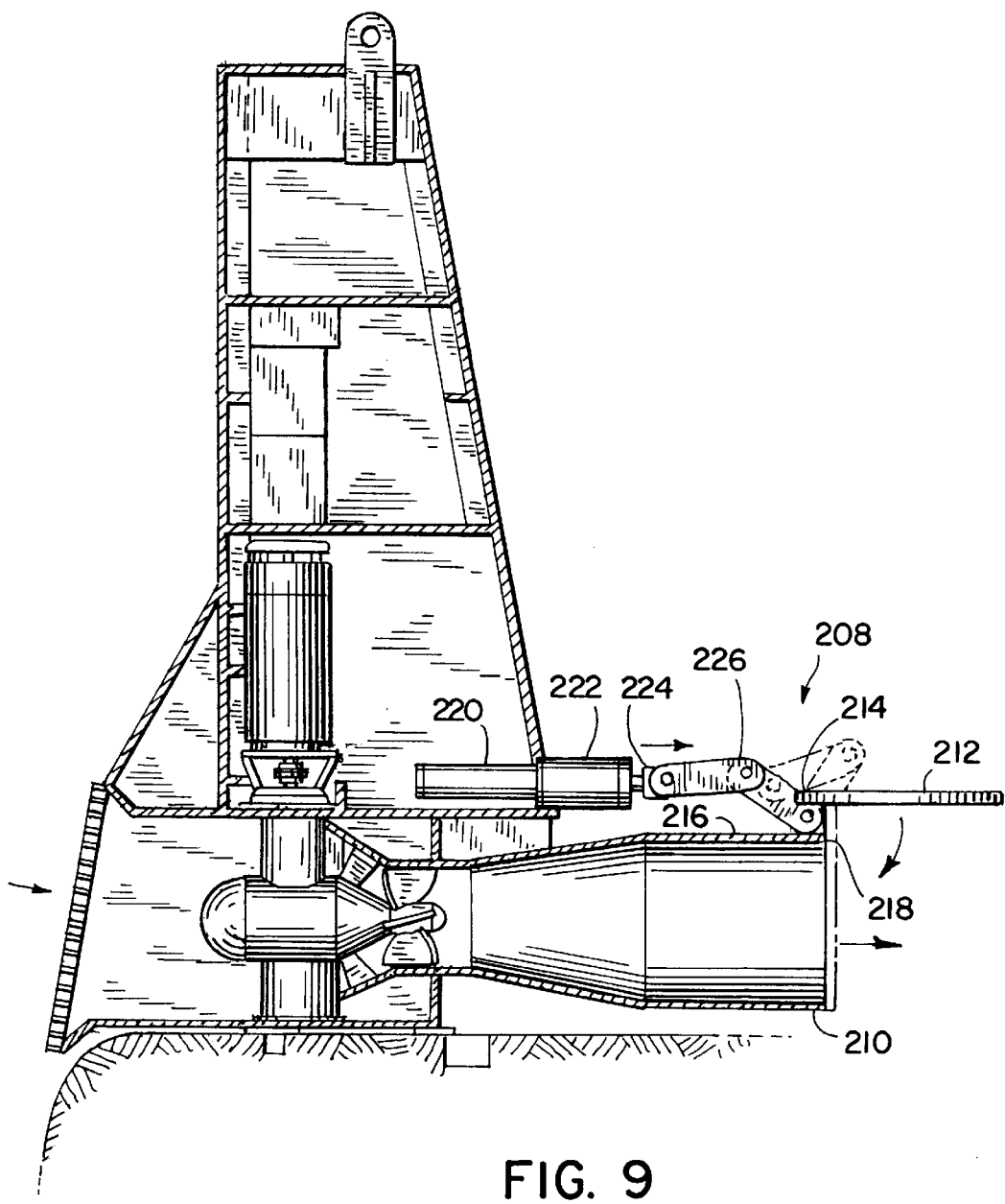
FIG. 9 is a cross-sectional view of the generating module of FIG. 7 showing the power generating components and a flap gate at the downstream end of the draft tube.

Turning now to FIG. 9, a flap gate 208 is shown associated with a draft tube 210 to control water flowing therethrough, and the remaining draft tubes are preferably provided with similar flap gates. Alternatively, a single flap gate could extend across more than one draft tube, or even across all of the draft tubes. Flap gate 208 comprises a swinging, generally rectangular plate 212 pivotally coupled along an edge 214 to an upper top surface 216 of draft tube 210 adjacent a downstream edge 218. Flap gate 208 is movable between a closed position (shown in phantom lines) in which the water flow through draft tube 210 is shut-off and an open position (shown in solid lines) in which the water flow through draft tube 210 is unrestricted by the gate, thus minimizing flow losses. An actuator 220 is provided for moving flap gate 208 between the open and closed positions. Actuator 220 includes a hydraulic cylinder 222 extending rearwardly from upper housing 202, a horizontally movable piston 224, and an articulated arm 226 which couples piston 224 to swinging plate 212.

Although a variety of embodiments have been particularly described, it should be understood that the above description is of preferred exemplary embodiments of the present invention, and that the invention is not limited to the specific forms described. For example, the horizontal and vertical members of the bulkhead structure could be associated in manners other than the one described herein depending on hydraulic considerations. In addition, structural reinforcement of the bulkhead could take other forms and the flap gate of the present invention could be mounted along a lower surface of the draft tube instead of the top surface thereof. Such other constructions are, nevertheless, considered to be within the scope of this invention. Accordingly, these and other substitutions, modifications, changes and omissions may be made in the design and arrangement of the elements as disclosed herein without departing from the scope of the appended claims.

What is claimed is:

1. A hydroelectric power generating module configured for placement in a spillway through which water flows, the module comprising:

an upper housing section having a plurality of generators situated therewithin;

a lower base section connected to the upper housing, the lower base section having a plurality of water flow paths extending therethrough from an upstream end to a downstream end, each water flow path comprising a water inlet proximate the upstream end, a draft tube extending from the downstream end toward the water inlet by a predetermined distance, and a distributor disposed intermediate the draft tube and the water inlet, the water inlets being defined by a first plurality of substantially horizontal members interconnected with a second plurality of substantially vertical members to form an array of water tubes having generally parallel axes; and a plurality of turbines, each turbine having a runner rotatably mounted within an associated one of the water flow paths downstream of an associated one of the distributors, at least one of the runners being mechanically coupled to an associated one of the generators for generating hydroelectric power by rotation of the at least one of the runners when water travels through the associated one of the flow paths.

2. The hydroelectric power generating module of claim 1, wherein each substantially horizontal member comprises a continuous steel plate extending laterally across an entire width of the module for carrying axial load caused by hydraulic pressure.

3. The hydroelectric power generating module of claim 2, wherein each substantially vertical member comprises a longitudinally extending steel plate for carrying vertical load caused by gravity.

4. The hydroelectric power generating module of claim 1, wherein the interconnected members defining the water inlets form a bulkhead structure upstream of the runners for guiding the water flow to the runners while withstanding hydraulic and gravitational loads on the module.

5. The hydroelectric power generating module of claim 4, further including a transversely extending substantially vertical member secured to a rear region of the array of water tubes and to the upper housing section, the transversely extending member providing structural integrity to strengthen the module under gravitational forces when the module is being lifted.

6. The hydroelectric power generating module of claim 5, wherein the transversely extending member is continuous and spans an entire width of the module and an entire height of the array, the transversely extending member including a plurality of apertures, each aperture having a respective one of the draft tubes extending therethrough.

7. The hydroelectric power generating module of claim 1, wherein the upper housing section comprises at least one air filled compartment configured to receive the generators.

8. The hydroelectric power generating module of claim 7, wherein the at least one air filled compartment includes at least one support rib extending along at least a wall thereof.

9. The hydroelectric power generating module of claim 7, wherein the at least one air filled compartment includes a plurality of support ribs extending laterally across an entire width of the module, each rib extending continuously along one of a front wall thereof and a bottom wall thereof.

10. The hydroelectric power generating module of claim 7, wherein the at least one air filled compartment includes a plurality of support ribs extending vertically along one of a front wall thereof and a rear wall thereof.

11. The hydroelectric power generating module of claim 1, wherein the upper housing section and lower base section have a combined height such that the module functions as a dam when placed in the spillway.

12. The hydroelectric power generating module of claim 1, further comprising an inclined plate secured to a front substantially vertical wall of the upper housing section and to an uppermost substantially horizontal member of the lower base section proximate the upstream end, the inclined plate extending continuously across an entire width of the module for reinforcing the module and for preventing trash build-up.

13. The hydroelectric power generating module of claim 1, wherein the array of water tubes includes at least two horizontal rows and a plurality of vertical columns, the module further comprising water control gates, each one of the gates being associated with a respective one of the columns for sliding movement relative thereto to control water flow through the water tubes of the respective one of the columns.

14. The hydroelectric power generating module of claim 13, wherein each column of water tubes defines an associated set of at least two turbines, each turbine of the associated set being coupled to a shaft of an associated generator by a hypoid gear arrangement.

15. The hydroelectric power generating module of claim 1, wherein the array of water tubes comprises a single horizontal row, the module further comprising flap gates located proximate the downstream end, each one of the gates being associated with at least a respective one of the draft tubes to control water flowing therethrough.

16. The hydroelectric power generating module of claim 15, wherein at least one of the flap gates is configured so that when the at least one of the gates is in an open position, all structures associated therewith are located outside the respective one of the draft tubes to minimize flow losses.

17. A hydroelectric power generating module configured for placement in a spillway through which water flows, the module comprising:

an upper housing section having a plurality of generators situated therewithin;

a lower base section connected to the upper housing, the lower base section having a plurality of water flow paths extending therethrough from an upstream end to a downstream end, each water flow path comprising a water inlet proximate the upstream end, a draft tube extending from the downstream end toward the water inlet by a predetermined distance, and a distributor disposed intermediate the draft tube and the water inlet, the water flow paths arranged in a single horizontal row;

a plurality of turbines, each turbine having a runner rotatably mounted within an associated one of the water flow paths downstream of an associated one of the distributors, at least one of the runners being mechanically coupled to an associated one of the generators for generating hydroelectric power by rotation of the at least one of the runners when water travels through the associated one of the flow paths; and at least one flap gate located proximate the downstream end, the at least one gate being associated with a respective one of the draft tubes and configured to control water flowing therethrough.

18. The hydroelectric power generating module of claim 17, wherein the gate is movable between a closed position in which the water flow through the respective one of the draft tubes is shut-off and an open position in which the water flow through the respective one of the draft tubes is unrestricted by the gate to minimize flow losses.

19. The hydroelectric power generating module of claim 18, wherein the at least one gate comprises a swinging plate located adjacent the downstream end.

20. The hydroelectric power generating module of claim 19, wherein the swinging plate is pivotally coupled along one edge thereof to the respective one of the draft tubes.

21. The hydroelectric power generating module of claim 19, wherein the swinging plate lies outside the respective one of the draft tubes when the at least one gate is in the open position.

22. The hydroelectric power generating module of claim 21, further including an actuator for moving the at least one gate between the open position and the closed position.

23. The hydroelectric power generating module of claim 22, wherein the actuator comprises a hydraulic arm extending from the upper housing section to the swinging plate.

24. The hydroelectric power generating module of claim 17, wherein the water inlets are defined by a first plurality of substantially horizontal members interconnected with a second plurality of substantially vertical members, the interconnected members forming a bulkhead structure upstream of the runners for guiding the water flow to the runners and carrying hydraulic and gravitational loads on the module.

25. The hydroelectric power generating module of claim 24, further including a transversely extending substantially vertical member secured to and spanning a rear region of the bulkhead structure, the transversely extending member providing structural integrity to strengthen the module under gravitational forces when the module is being lifted.

26. The hydroelectric power generating module of claim 17, wherein the upper housing section includes at least one continuous support rib which extends laterally across an entire width of the module.

27. The hydroelectric power generating module of claim 17, further comprising an inclined plate secured to a front substantially vertical wall of the upper housing section and to an uppermost substantially horizontal member of the lower base section proximate the upstream edge, the inclined plate extending substantially across a width of the module for reinforcing the module and for preventing trash build-up.

28. A hydroelectric power generating module configured for placement in a spillway through which water flows, the module comprising:
an upper housing section having a plurality of generators situated therewithin;
a lower base section connected to the upper housing, the lower base section having a plurality of water flow paths extending therethrough from an upstream end to a downstream end, each water flow path comprising a water inlet proximate the upstream end, a draft tube extending from the downstream end toward the water inlet by a predetermined distance, and a distributor disposed intermediate the draft tube and the water inlet, the water flow paths arranged in an array having at least two rows and a plurality of columns; and
a plurality of turbines, each turbine having a runner rotatably mounted within an associated one of the water flow paths downstream of an associated one of the distributors, the turbines of a common column being mechanically coupled to a respective one of the generators by bevel type gearing arrangement.

29. The hydroelectric power generating module of claim 28, wherein each row extends generally horizontally and each column extends generally vertically.

30. The hydroelectric power generating module of claim 29, wherein each turbine of each common column includes a horizontal shaft coupled by bevel type gearing to a respective vertical shaft extending from the respective one of the generators.

31. The hydroelectric power generating module of claim 30, wherein the horizontal shaft of each turbine is offset from the respective vertical shaft of the respective one of the generators, so that torque of each turbine is transmitted through only one gear mesh to the respective one of the generators.

32. The hydroelectric power generating module of claim 30, wherein the bevel type gearing is hypoid.

33. The hydroelectric power generating module of claim 28, wherein the water inlets are bounded by spaced apart substantially horizontal members, each member comprising a continuous plate extending substantially across a width of the module for carrying axial load caused by hydraulic pressure.

34. The hydroelectric power generating module of claim 28, wherein the water inlets are defined by a first plurality of substantially horizontal members interconnected with a second plurality of substantially vertical members, the interconnected members forming a bulkhead structure upstream of the runners for guiding the water flow to the runners while carrying hydraulic and gravitational loads on the module.

35. The hydroelectric power generating module of claim 34, further including a transversely extending substantially vertical member secured to and spanning a rear region of the bulkhead structure, the transversely extending member providing structural integrity to strengthen the module under gravitational forces when the module is being lifted.

36. The hydroelectric power generating module of claim 28, wherein the upper housing section includes at least one continuous support rib which extends laterally across an entire width of the module.

37. The hydroelectric power generating module of claim 28, further comprising an inclined plate secured to a front substantially vertical wall of the upper housing section and to an uppermost substantially horizontal member of the lower base section proximate the upstream edge, the inclined plate extending continuously across an entire width of the module for reinforcing the module and for preventing trash build-up.

38. A hydroelectric power generating module configured for placement in a spillway through which water flows, the module comprising:
an upper housing section having a plurality of generators situated therewithin;
a lower base section connected to the upper housing, the lower base section having a plurality of water flow paths extending therethrough from an upstream end to a downstream end;
a plurality of turbines, each turbine having a runner rotatably mounted within an associated one of the water flow paths, at least one of the runners being mechanically coupled to an associated one of the generators for generating hydroelectric power by rotation of the at least one of the runners when water travels through the associated one of the water flow paths; and
means for guiding the water flow to the runners and withstanding hydraulic and gravitational loads on the module.

39. The hydroelectric power generating module of claim 38, wherein the means for guiding the water flow to the runners and carrying hydraulic and gravitational loads on the module comprises a first plurality of substantially horizontal members interconnected with a second plurality of substantially vertical members, the interconnected members defining a plurality of water inlet guides and forming a reinforcing bulkhead structure upstream of the runners.

40. A hydroelectric power generating module configured for placement in a spillway through which water flows, the module comprising:
an upper housing section configured for receiving N generators therewithin; and a lower base section connected to the upper housing, the lower base section including a first plurality of substantially horizontal members interconnected with a second plurality of substantially vertical members to form an array of water tubes having M substantially horizontal rows and N substantially vertical columns, the interconnected members defining M×N water flow paths having an upstream end and a downstream end, each water flow path comprising a water inlet proximate the upstream end, a draft tube extending from the downstream end toward the water inlet by a predetermined distance, and a distributor disposed intermediate the draft tube and the water inlet.

\* \* \* \* \*